(12) United States Patent
Tsumiyama

(10) Patent No.: US 7,062,989 B2
(45) Date of Patent: Jun. 20, 2006

(54) BICYCLE CONTROL DEVICE

(75) Inventor: Akira Tsumiyama, Sakai (JP)

(73) Assignee: Shimano Inc., Osaka (JP)

( * ) Notice: Subject to any disclaimer, the term of this patent is extended or adjusted under 35 U.S.C. 154(b) by 187 days.

(21) Appl. No.: 10/629,831

(22) Filed: Jul. 30, 2003

(65) Prior Publication Data

US 2005/0022624 A1  Feb. 3, 2005

(51) Int. Cl.
  *F16C 1/10*  (2006.01)
(52) U.S. Cl. .................................. 74/502.2; 74/489
(58) Field of Classification Search ............ 74/502.2, 74/489
  See application file for complete search history.

(56) References Cited

U.S. PATENT DOCUMENTS

| | | | | |
|---|---|---|---|---|
| 3,176,536 | A | * | 4/1965 | Altenburger ............... 74/489 |
| 4,100,820 | A | | 7/1978 | Evett |
| 4,308,761 | A | * | 1/1982 | Shimano .................. 74/489 |
| 4,759,230 | A | * | 7/1988 | Nagano .................... 74/489 |
| 5,009,119 | A | * | 4/1991 | Nagano .................... 74/489 |
| 5,241,878 | A | * | 9/1993 | Nagano .................. 74/502.2 |
| 5,400,675 | A | | 3/1995 | Nagano |
| 5,448,927 | A | | 9/1995 | Lumpkin |
| 5,493,933 | A | * | 2/1996 | Kelly ...................... 74/489 |
| 5,515,743 | A | | 5/1996 | Lumpkin |
| 5,584,210 | A | * | 12/1996 | Gelbein ................... 74/489 |
| 5,609,064 | A | * | 3/1997 | Abe ..................... 74/502.2 |
| 5,674,142 | A | | 10/1997 | Jordan |
| 5,775,168 | A | * | 7/1998 | Furuta .................... 74/489 |
| 5,910,193 | A | * | 6/1999 | Chen ..................... 74/489 |
| 5,946,978 | A | | 9/1999 | Yamashita |
| 6,112,614 | A | | 9/2000 | Yamashita |
| 6,170,356 | B1 | | 1/2001 | Campagnolo |
| 6,263,754 | B1 | * | 7/2001 | Wesling et al. ............. 74/489 |
| 6,647,823 | B1 | * | 11/2003 | Tsumiyama et al. ....... 74/501.6 |
| 2002/0139637 | A1 | | 10/2002 | Tsumiyama et al. |

FOREIGN PATENT DOCUMENTS

| | | | | |
|---|---|---|---|---|
| EP | 0669250 | A1 | 8/1995 | |
| EP | 079176 | A1 | 8/1997 | |
| FR | 1312267 | | 12/1962 | |
| GB | 965862 | | 8/1964 | |
| GB | 2 167 839 | A | * 6/1986 | ............... 74/502.2 |
| TW | 250793 | | 7/1995 | |

* cited by examiner

*Primary Examiner*—Vinh T. Luong
(74) *Attorney, Agent, or Firm*—Global IP Counselors

(57) ABSTRACT

A bicycle control device has a lightweight, ergonomic control lever for controlling both a braking device and a shifting device. The lever has an attachment section, an intermediate section and an actuating section. Preferably, at least one of the intermediate and actuating sections has a hollow zone. The lever preferably moves along first and second substantially perpendicular planes to control the braking device and the shifting device, respectively. Preferably, the actuating section has first and second actuation surfaces. The first surface extends in a direction substantially perpendicular to the first plane to move the lever along the first plane. The second actuation surface is inclined relative to the planes and the first surface to move the lever along the second plane. The second surface has a transverse dimension that is preferably at least one-half of the transverse dimension of the first surface.

12 Claims, 10 Drawing Sheets

BICYCLE CONTROL DEVICE

BACKGROUND OF THE INVENTION

1. Field of the Invention

This invention generally relates to a bicycle control device that has a single control lever that operates a brake mechanism and a gear shifting mechanism. More specifically, the present invention in relates to a bicycle control device with an ergonomic, relatively lightweight control lever.

2. Background Information

Bicycling is becoming an increasingly more popular form of recreation as well as a means of transportation. Moreover, bicycling has become a very popular competitive sport for both amateurs and professionals. Whether the bicycle is used for recreation, transportation or competition, the bicycle industry is constantly improving the various components of the bicycle. In particular, control devices for braking and/or shifting have been extensively redesigned in recent years.

Generally, when riding a bicycle, it is desirable to be able to operate the brake control mechanism and the shift control mechanism of the bicycle quickly and easily while maintaining a firm grasp on the handlebar. Recently, control devices have been designed that utilize a single brake/shift lever to operate both a brake control mechanism and a shift control mechanism of the bicycle. If the brake/shift lever has an outer surface that is formed by several relatively small surfaces that do not interface in a smooth manner, a rider will feel some pain when the rider applies a force to the single brake/shift lever during gear shifting. Also, a heavy single brake/shift lever can result in inadvertent gear shifting. In particular, if the bicycle moves along a bumpy surface and the single brake/shift lever is heavy, the brake/shift lever may move in a vertical direction. This movement of the brake/shift lever can cause unexpected gear shifting on the bicycle.

An example of a bicycle control device with a single brake/shift lever is disclosed in U.S. Patent Application Publication No. US2002/0139637 (assigned to Shimano, Inc.). While this device works very well, this device can be uncomfortable for some riders when moving the control lever with fingers to shift gears. Moreover, this device may not be as lightweight as desired.

In view of the above, it will be apparent to those skilled in the art from this disclosure that there exists a need for an improved control device. This invention addresses this need in the art as well as other needs, which will become apparent to those skilled in the art from this disclosure.

SUMMARY OF THE INVENTION

One object of the present invention is to provide a bicycle control device with an ergonomic control lever that is comfortable and simple to operate during braking and gear shifting operations.

Another object of the present invention is to provide a bicycle control device that is relatively simple and inexpensive to manufacture and assemble.

Another object of the present invention is to provide a bicycle control device with a relatively lightweight yet relatively strong control lever.

Yet another object of the present invention is to provide a bicycle control device with a control lever that is relatively lightweight to suppress inadvertent gear shifting when the bicycle moves along a bumpy surface.

The foregoing objects can basically be attained by providing a bicycle control device with a mounting portion, a control mechanism and a control lever. The mounting portion is adapted to be coupled to a bicycle. The control mechanism is coupled to the mounting portion. The control lever is operatively coupled to the control mechanism. The control lever includes an attachment section, an intermediate section extending from the attachment section and an actuating section extending from the intermediate section. The attachment section is operatively coupled to the control mechanism. At least one of the intermediate section and the actuating section has a hollow zone formed therein that extends axially along the at least one of the intermediate section and the actuating section of the control lever.

The foregoing objects can basically be attained by providing a bicycle control device having a mounting portion, a control mechanism and a control lever. The mounting portion is adapted to be coupled to a bicycle handlebar. The control mechanism is coupled to the mounting portion. The control lever is operatively coupled to the control mechanism to move along a first plane between a rest position and a operating position and along a second plane substantially perpendicular to the first plane between the rest position and a first position vertically spaced from the rest position. The control lever includes an attachment section and an actuating section extending from the attachment section. The attachment section is operatively coupled to the control mechanism. The actuating section has a first actuation surface extending in a direction substantially perpendicular to the first plane and an inclined second actuation surface facing substantially away from the first actuation surface, downwardly and towards the handlebar. The inclined second actuation surface extends in a direction intersecting the first and second planes. The inclined second actuation surface has a transverse height that is at least one-half of the transverse height of the first actuation surface. The transverse heights are measured in directions perpendicular to the first plane.

These and other objects, features, aspects and advantages of the present invention will become apparent to those skilled in the art from the following detailed description, which, taken in conjunction with the annexed drawings, discloses preferred embodiments of the present invention.

BRIEF DESCRIPTION OF THE DRAWINGS

Referring now to the attached drawings which form a part of this original disclosure.

Like reference numerals refer to the same parts throughout FIGS. 1–16.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Figure 1:
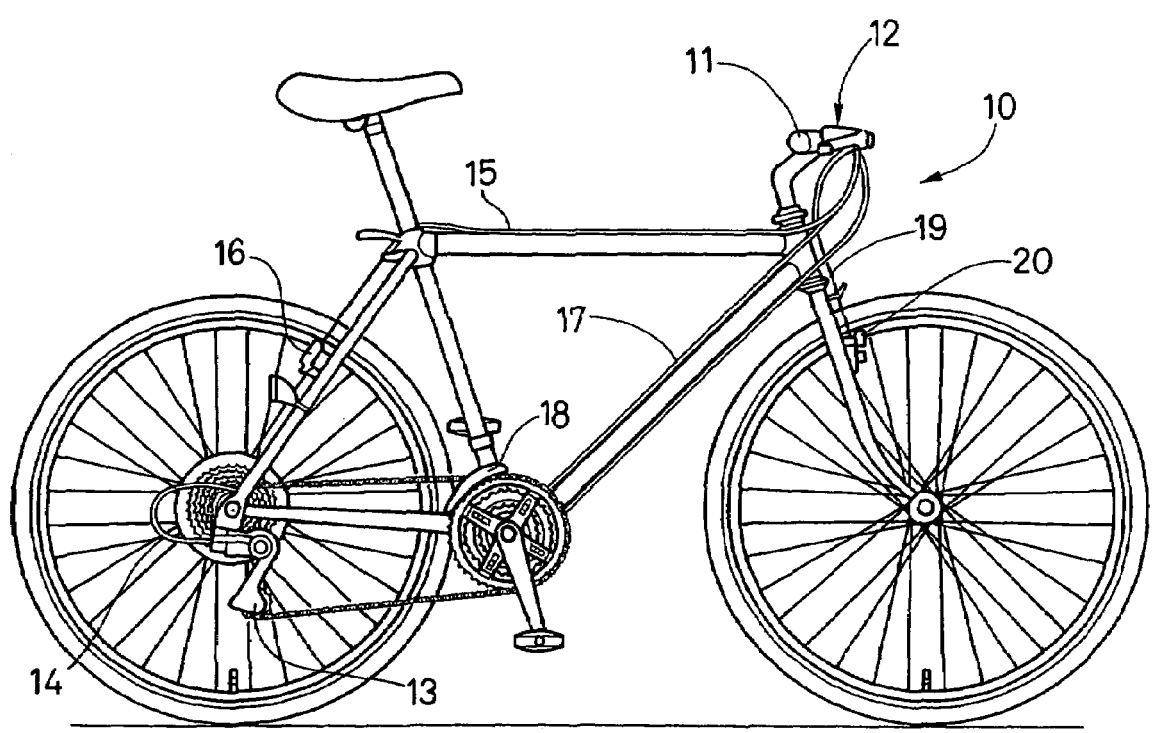
FIG. 1 is a side elevational view of a bicycle equipped with a control device having a control lever in accordance with a first embodiment of the present invention.

Referring initially to FIG. 1, a bicycle 10 is illustrated with a bicycle control device 12 mounted on a bicycle handlebar 11 in accordance with one embodiment of the present invention. The bicycle control device 12 is a right hand side control device 12 operated by the rider's right hand. The control device 12 is preferably operatively coupled to a rear derailleur 13 via a shift control cable 14 and to a rear brake device 16 via a brake control cable 15. Preferably, the bicycle 10 includes a left hand side bicycle control device (not shown) that is substantially identical to the control device 12. Preferably, the left hand side bicycle control device is operatively coupled to a front derailleur 18 via a shift control cable 17 and a front brake device 20 via a brake control cable 19. The left hand side bicycle control device is essentially identical in construction and operation to the control device 12, except that it is a mirror image of the control device 12 and the number of shift positions for the left hand side bicycle control device is different. Thus, only the control device 12 will be discussed and illustrated herein.

As used herein to describe the bicycle control device 12, the following directional terms "forward, rearward, above, downward, vertical, horizontal, below and transverse" as well as any other similar directional terms refer to those directions of a bicycle equipped with the present invention. Accordingly, these terms, as utilized to describe the present invention should be interpreted relative to a bicycle equipped with the bicycle control device 12 of the present invention.

Since most of the parts of the bicycle 10 are well known in the art, the parts of the bicycle 10 will not be discussed or illustrated in detail herein, except for the parts that relate to the present invention. In other words, only the parts related to the bicycle control device 12 will be discussed and illustrated in detail herein. Moreover, various conventional bicycle parts such as brakes, additional sprockets, derailleurs, etc., which are not illustrated and/or discussed in detail herein, can be used in conjunction with the present invention.

Figure 2:
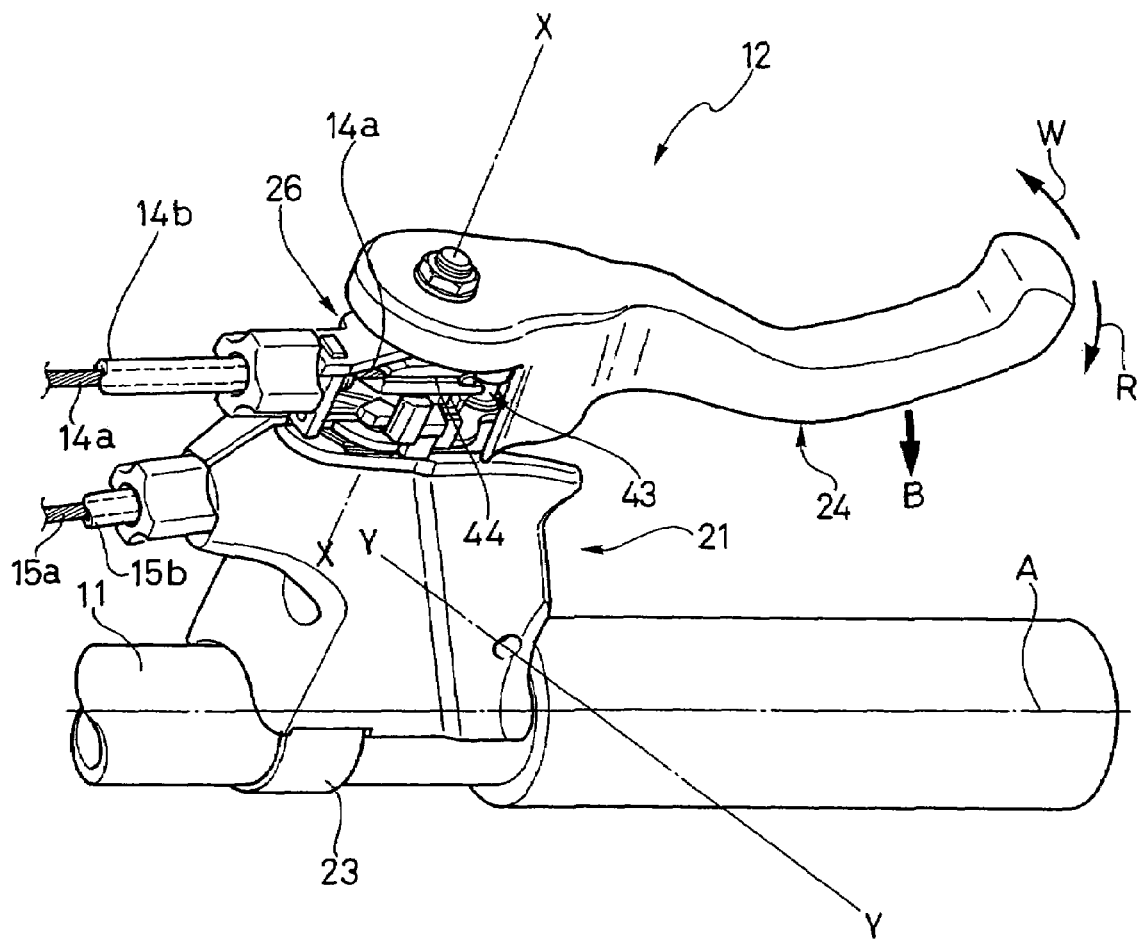
FIG. 2 is an enlarged perspective view of the bicycle control device illustrated in FIG. 1.
Figure 3A:
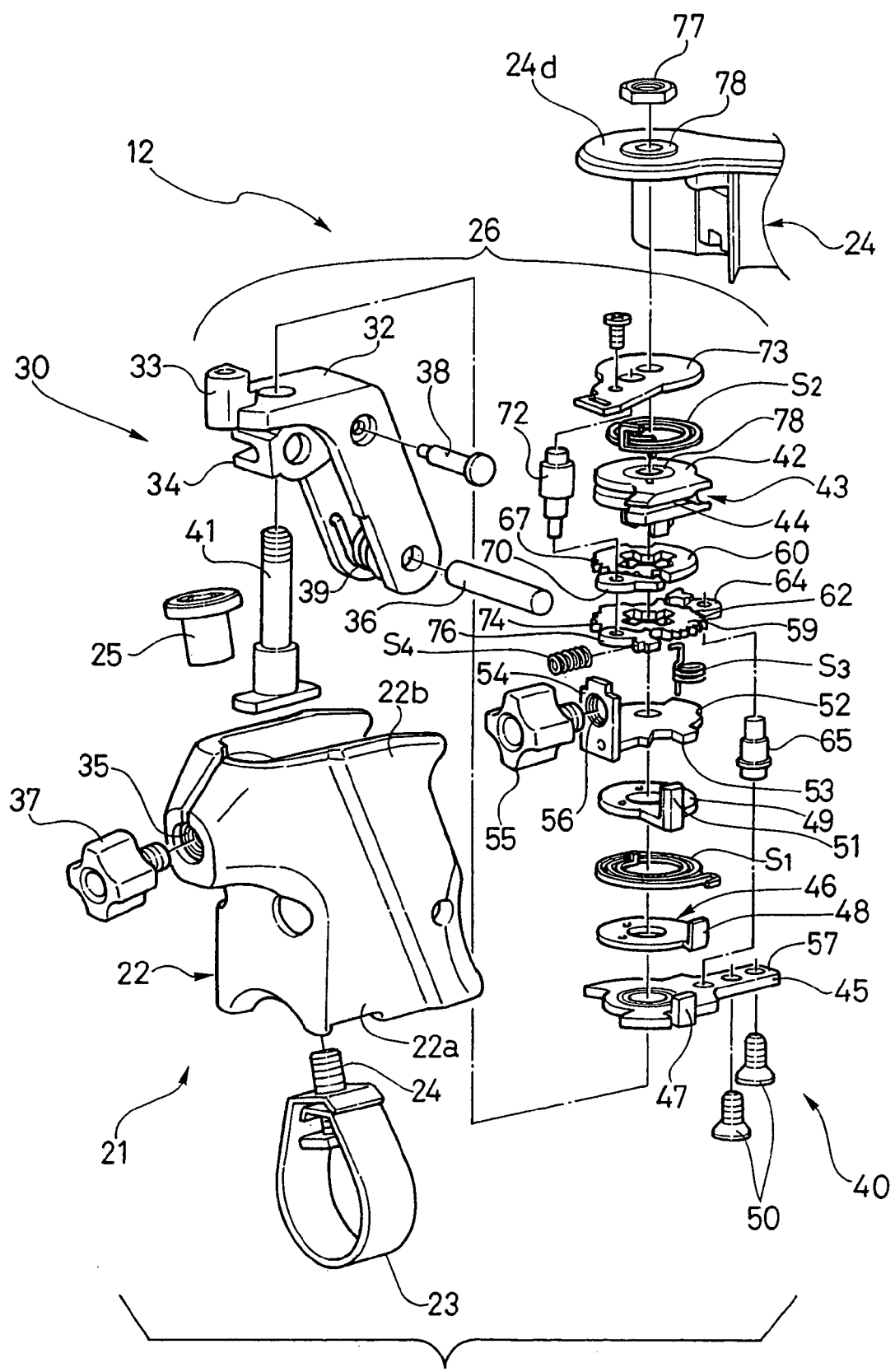
FIG. 3A is an exploded perspective view of the bicycle control device illustrated in FIG. 2.

Referring now to FIGS. 2 and 3A, the bicycle control device 12 basically includes a control lever 24, a mounting portion 21 and a control mechanism 26. The control lever 24 is operably coupled to the control mechanism 26. The control lever 24 of the present invention is configured to allow a rider to operate the bicycle control device 12 during braking and/or gear shifting via the control mechanism 26, as discussed below. The control mechanism 26 is movably coupled to the mounting portion 21. The mounting portion 21 is arranged and configured to be coupled to the bicycle handlebar 11 of the bicycle 10.

The control mechanism 26 basically functions in the same manner as described in U.S. Patent Application Publication No. US2002/0139637 (assigned to Shimano, Inc.). Thus, details describing the construction and operation of the control mechanism 26 have been omitted. In other words, the control mechanism 26 will only be discussed and illustrated in sufficient detail to make and use the bicycle control device 12 of the present invention.

Preferably, the bicycle handlebar 11 is a conventional flat-bar type handlebar having a cylindrical tubular body that extends substantially along a handlebar axis A that is transverse to the longitudinal center plane of the bicycle 10. The mounting portion 21 includes a bracket 22 with a mounting end portion 22a arranged and configured to be coupled to the bicycle handlebar 11 and a distal end portion 22b longitudinally spaced from the mounting end portion 22a. The mounting end portion 22a has a clamp band 23, a bolt 24 and a nut 25 that secure the mounting portion 21 to the bicycle handlebar 11. The distal end portion 22b of the bracket 22 is arranged and configured to be coupled to the control mechanism 26, as described in greater detail below.

The control mechanism 26 is arranged and configured to operate cable actuated bicycle components via movement of the control lever 24. The control mechanism 26 basically includes a brake control mechanism 30 and a shift control mechanism 40.

Figure 8:
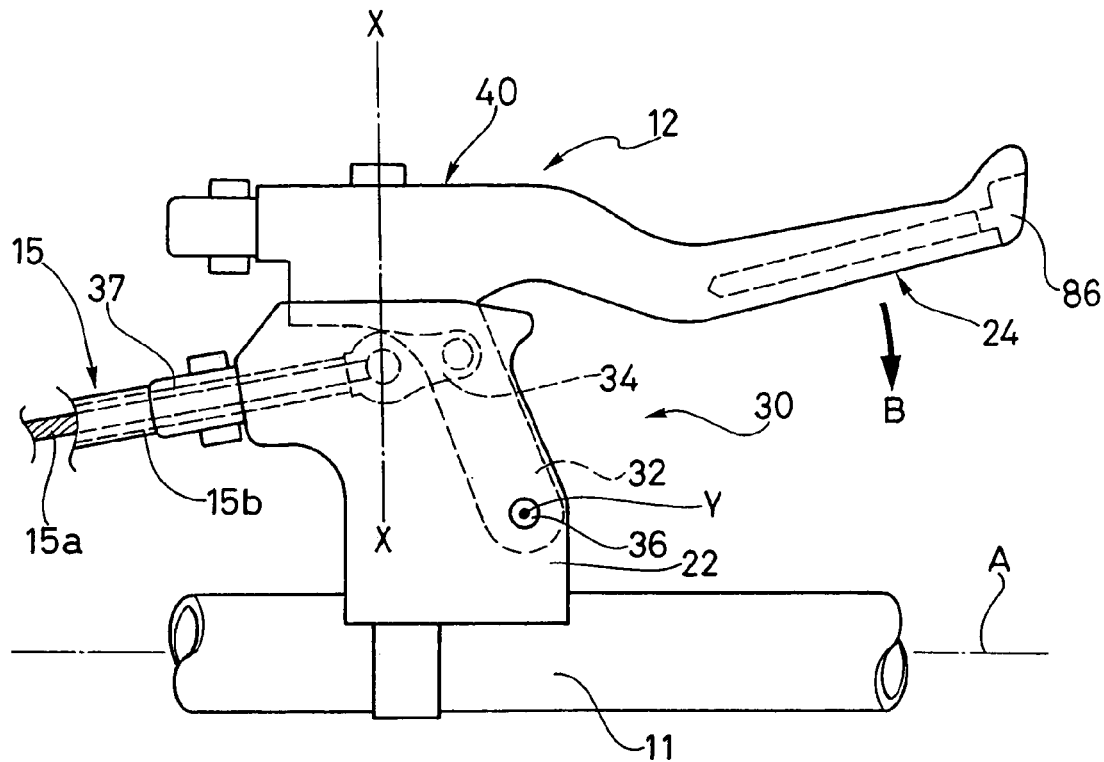
FIG. 8 is a substantially top plan view of the control device illustrated in FIGS. 1–3, with the control lever in the release position and portions diagrammatically illustrated for the purpose of illustration.
Figure 9:
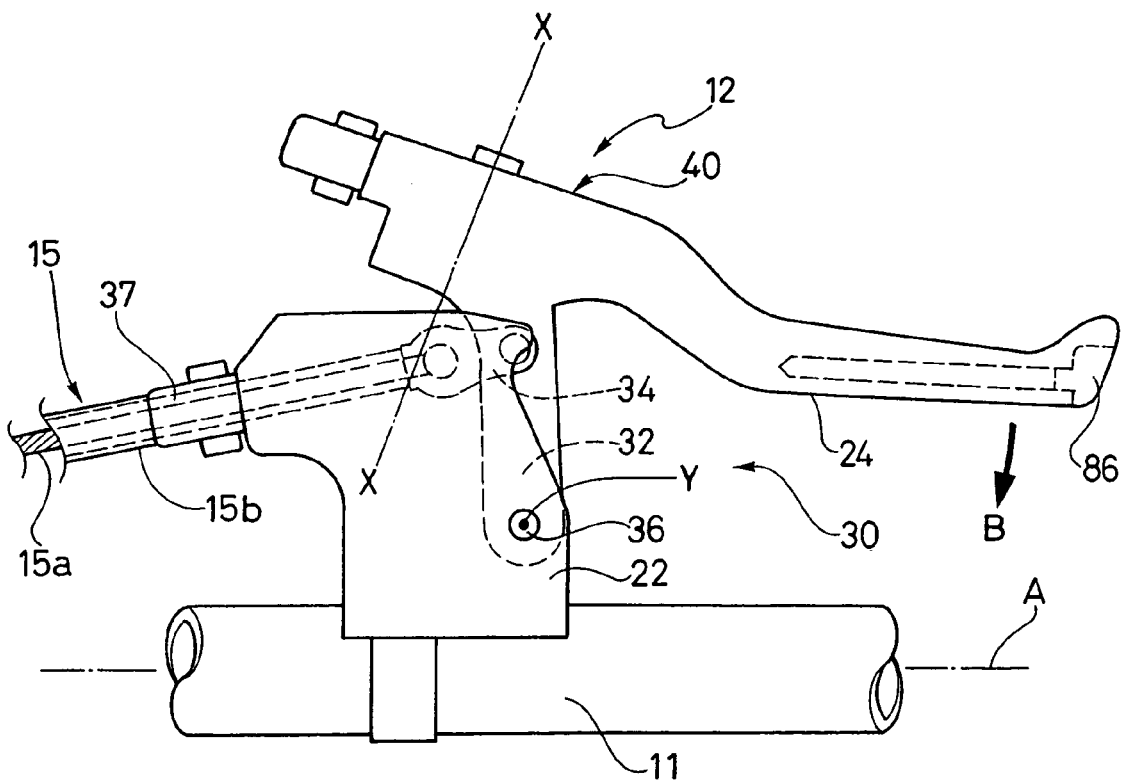
FIG. 9 is a substantially top plan view of the control device illustrated in FIGS. 1–3, with the control lever in the operating position and portions diagrammatically illustrated for the purpose of illustration.

Referring now to FIGS. 2, 3A, 8 and 9, the brake control mechanism 30 has a pivot axis Y—Y and the shift control mechanism 40 has a pivot axis X—X. Preferably, the axis Y—Y is substantially perpendicular to the axis X—X. The control lever 24 is operatively coupled to the control mechanism 26 such that rotation of the control lever 24 from a brake rest position about the pivot axis Y—Y in a direction B operates the brake control mechanism 30. The control lever 24 is also operatively coupled to the shift control mechanism 40 such that rotation of the control lever 24 from a shift rest position about the pivot axis X—X in a direction W operates the shift control mechanism 40 in a winding direction, while rotation of the control lever 24 from the shift rest position about the pivot axis X—X in a direction R operates the shift control mechanism 40 in a release direction. FIGS. 2 and 8 show an overall neutral or rest position (i.e., that corresponds to both the shift and brake rest positions) of the control lever 24. FIG. 9 shows an operating position of the control lever 24 during a braking operation. During a braking operation, the shift rest position moves such that the rider can shift and brake at the same time.

Preferably the bicycle control device 12 is arranged and configured such that a rider views the bicycle control device 12 while sitting on the bicycle 10 and gripping the bicycle handlebar 11. From this viewpoint, the axis X—X extends substantially longitudinally (i.e., from front to back) relative to the bicycle 10, while the axis Y—Y extends in a substantially vertical direction relative to the bicycle 10. From this viewpoint, the direction B is a substantially rearward direction of movement of the control lever 24 from the rest position of the brake control mechanism 30 towards the bicycle handlebar 11. From this viewpoint, the direction W is a substantially vertically downward direction of movement of the control lever 24 relative to the rest position of control lever 24. On other hand, the direction R is a substantially vertically upward direction of movement of the control lever 24 relative to the rest position of the control lever 24. Thus, movement of the control lever 24 in the direction W causes the control lever 24 to be at least partially vertically spaced downward from the rest position, while movement of control lever 24 in the direction R causes the control lever 24 to be at least partially vertically spaced upward from the rest position.

Figures 4, 5:
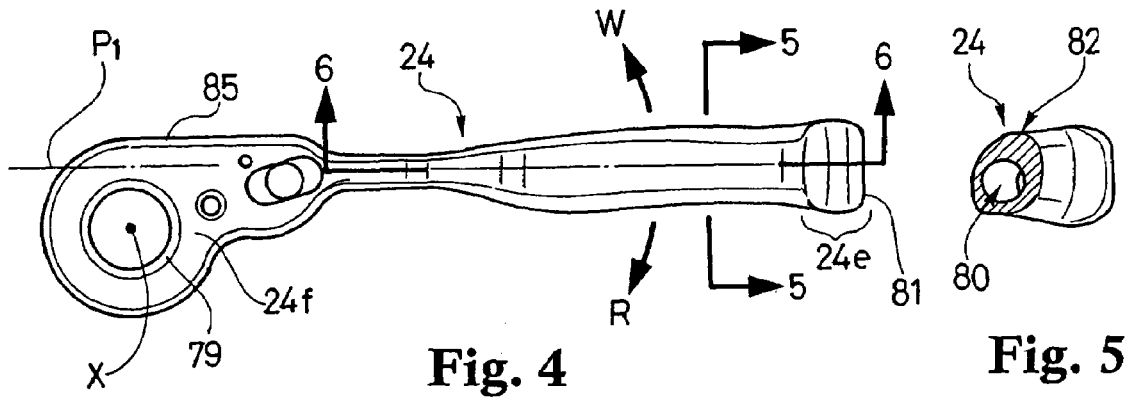
FIG. 4 is a substantially front elevational view of the control lever of the bicycle control device illustrated in FIGS. 1–3.
FIG. 5 is a transverse cross-sectional view of the control lever illustrated in FIG. 4, as viewed along section line 5—5 of FIG. 4.
Figure 6:
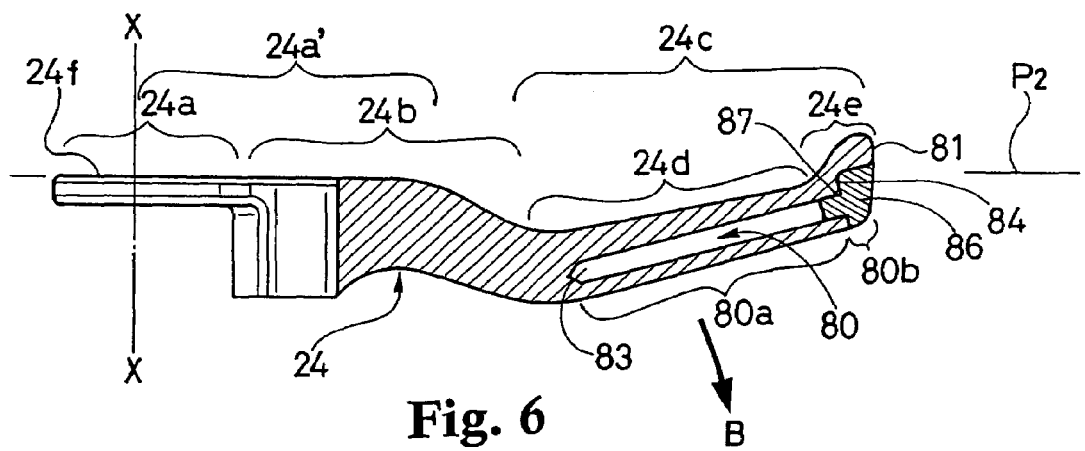
FIG. 6 is a partial cross-sectional view of the control lever illustrated in FIGS. 4 and 5 as viewed along section line 6—6 of FIG. 4, with the attachment section shown in elevation for the purpose of illustration.

Referring now to FIGS. 4–6, the control lever 24 is illustrated in accordance with a first embodiment of the present invention. The control lever 24 is configured to be used with the bicycle control device 12. The control lever 24 basically includes an attachment portion 24a, an intermediate portion 24b and an actuating portion 24c. The actuating section 24c includes a gripping part 24d and an enlarged end part 24e. The gripping part 24d has a substantially uniform outer shape extending along a majority of the gripping part 24d. More specifically, the outer shape of the gripping part 24d is uniform along a longitudinal axis of the actuating section 24c over a distance at least equal to the width of one, or preferably two fingers of the rider. The intermediate portion 24b extends from the attachment section 24a, and the actuating section 24c extends from the intermediate section 24b. The attachment section 24a of the control lever 24 has a substantially straight lower side surface 85. A first plane $P_1$ is substantially parallel to the lower side surface 85 and the pivot axis X—X. The attachment section 24a of the control lever 24 also has a front side surface 24f lying in a second plane $P_2$ that is substantially perpendicular to pivot the axis X—X. Preferably, the second plane $P_2$ is substantially perpendicular to the first plane $P_1$.

When the rider moves the control lever 24 from the rest position of FIG. 8 in the direction B to the operating (braking) position of FIG. 9, the control lever 24 rotates about the axis Y—Y and the control lever 24 moves along the first plane $P_1$.

When the rider moves the control lever 24 from the shift rest position (e.g., FIGS. 2, 8 and 9) in the direction R, the control lever 24 rotates clockwise about the axis X—X as viewed along the axis X—X from in front of the bicycle 10. This causes the control lever 24 to move along the second plane $P_2$. The direction R can be considered a first direction.

On the other hand, when the rider moves the control lever 24 from the shift rest position in the direction W, the control lever 24 rotates counterclockwise about the axis X—X. This causes the control lever 24 to move along the second plane $P_2$. Thus, the direction W can be considered a second direction that is opposite to the first direction.

Referring now to FIG. 3A, the brake control mechanism 30 is arranged and configured to actuate the brake control cable 15 to operate the rear brake device 16. The brake control mechanism 30 basically includes a brake lever base 32, a cable hook or brake cable attachment portion 34, a pivot pin 36, a pivot pin 38, a brake cable receiving bore 35 and a brake cable adjuster 37. The brake cable adjuster 37 is configured to adjust the brake cable tension. A torsion spring 39 is operatively coupled between the brake lever base 32 and the bracket 22 to normally bias the control lever 24 towards the rest position. Thus, one end of the torsion spring 39 is located in a hole in the brake lever base 32 as seen in FIG. 3A and the other end of the torsion spring 39 is located in a hole or recess in the bracket 22. Thus, the control lever 24 is normally biased toward the rest position in order to release the brake control cable 15 after moving the control lever 24 to the operating position and releasing the control lever 24.

The control lever 24 is operatively coupled to the brake control mechanism 30 such that movement of the control lever 24 about the Y—Y axis in the direction B causes movement of the brake lever base 32 relative to the mounting portion 21 to pull the brake control cable 15.

The brake lever base 32 is pivotally coupled to the bracket 22 of the mounting portion 21 via the pivot pin 36. The brake control cable 15 has an outer casing 15b and a brake cable 15a. The brake cable adjuster 37 is adjustably coupled to the brake cable receiving bore 35. The brake cable adjuster 37 receives the outer casing 15b. The brake cable 15a is inserted into the bracket 22 of the mounting portion 21. The brake cable attachment portion 34 is pivotally coupled to the brake lever base 32 via the pivot pin 38. The brake cable attachment portion 34 is arranged and configured to couple an end of the brake cable 15a thereto in a conventional manner, such that movement of the brake cable attachment portion 34 causes movement of the brake cable 15a. Thus, movement of the control lever 24 in the direction B causes the brake cable (i.e., the inner wire) 15a to be pulled.

On the other hand, the shift control mechanism 40 is arranged and configured to pull and release the shift control cable 14 to operate the rear derailleur 13. The shift control mechanism 40 basically includes a pivot shaft 41, a winding member 42, an operating plate 45, a winding plate 46, a releasing plate 49 and a fixed plate 52. The winding member 42 is rotatably supported on the pivot shaft 41. The shift control cable 14 has an outer casing 14b and a shift cable or inner wire 14a.

The winding member 42 has a shift cable attachment portion 43 and a winding groove 44. The shift cable attachment portion 43 is configured to secure an end of the shift cable 14a thereto as seen in FIG. 2. The winding groove 44 receives the shift cable 14a as it is wound on the winding member 42.

The control lever 24 is operatively coupled to the shift control mechanism 40 such that rotation of the control lever 24 about the X—X axis in the direction R causes the winding member 42 to rotate about the pivot shaft 41 for releasing the shift cable 14a. On the other hand, rotation of the control lever 24 about the X—X axis in the direction W causes the winding member 42 to rotate about the pivot shaft 41 for winding the shift cable 14a. The winding or release of the cable 14a operates the rear derailleur 13 in a conventional manner. Preferably, the pivot shaft 41 is fixedly coupled to the brake lever base 32.

The operating plate 45 is rotatably supported on the pivot shaft 41 and includes a brake lever mounting portion 57 and an operating abutment 47. Preferably, the brake lever mounting portion 57 is fixedly coupled to the control lever 24 such that movement of the control lever 24 about the pivot shaft 41 causes movement of the operating plate 45 about the pivot shaft 41.

The winding plate 46 and the releasing plate 49 are rotatably supported on the pivot shaft 41, while the fixed plate 52 is fixedly supported on the pivot shaft 41. The winding plate 46 has a winding abutment 48 and the releasing plate 49 has a releasing abutment 51. The fixed plate 52 is fixedly coupled to a mounting member 33 of the brake lever base 32. The fixed plate 52 has a fixed abutment 53 and a cable stop 54. The cable stop 54 is configured to receive an end of the shift cable 14a. As best shown in FIG. 2, the outer casing 14b of the shift control cable 14 is received in a shift cable adjuster 55 and the shift cable 14a is inserted through a shift cable receiving bore 56 of the shift cable adjuster 55. The shift cable adjuster 55 is adjustably coupled to the cable stop 54 to allow the rider to adjust shift cable tension.

Preferably, the winding abutment 48 of the winding plate 46 and the releasing abutment 51 of the releasing plate 49 are biased by a spring $S_1$ toward the fixed abutment 53 of the fixed plate 52. In a rest position, the winding abutment 48 abuts a first side 53a of the fixed abutment 53 and the releasing abutment 51 abuts a second side 53b of the fixed abutment 53. The operating abutment 47 is located between the winding abutment 48 and the releasing abutment 51. The operating abutment 47 moves the winding abutment 48 in the winding direction W, when the control lever 24 is moved in the direction W and moves the releasing abutment 51 in the direction R, when the control lever 24 is moved in the direction R.

The winding member 42 is biased in the release direction R, by a second spring $S_2$. In order for the winding member 42 to rotate, a first latch plate 59 and a second latch plate 60 are fixedly coupled to the winding member 42 such that the winding member 42, the first latch plate 59 and the second latch plate 60 rotate together about the pivot shaft 41. To operate the winding member 42 in a winding direction, a winding mechanism 61 is provided including a winding latch 62 defined peripherally of the first latch plate 59 having a plurality of teeth 63, a winding pawl 64 for engaging the teeth 63 of the winding latch 62, and a third spring $S_3$ for urging the winding pawl 64 toward an engaging position. The winding pawl 64 is preferably rotatably supported on a pivot shaft 65 that is coupled to the operating plate 45.

To operate the winding member 42 in a release direction, a hold and release mechanism 66 is provided including an interrupting latch 67 defined peripherally on the second latch plate 60 with a plurality of teeth 69 and an interrupting pawl 70 for engaging the teeth 69 of the interrupting latch 67. The interrupting pawl 70 is preferably freely rotatably supported on a pivot shaft 72 that is fixedly connected to an upper plate 73. The hold and release mechanism 66 also includes a positioning latch 74 with a plurality of teeth 75 defined peripherally on the first latch plate 59, a positioning pawl 76 for engaging the teeth 75 of the positioning latch 74, and a fourth spring $S_4$ for urging the positioning pawl 76 toward an engaging position. The positioning pawl 76 is preferably rotatably supported on the pivot shaft 72. The positioning latch 74 is preferably spaced apart from the winding latch 62.

The upper plate 73 is fixedly supported on the cable stop 54, the pivot shaft 72 and the pivot shaft 41. A nut 77 is installed on the pivot shaft 41. Bearings 78 are provided in the shift control mechanism 40 to facilitate smooth operation of the control lever 24 and the shift control mechanism 40. The bearings 78 can include ball bearings. However, any other suitable bearing or bearings that facilitate smooth operation of the control lever 24 and the shift control mechanism 40 can be used, as needed or desired.

Figure 3B:
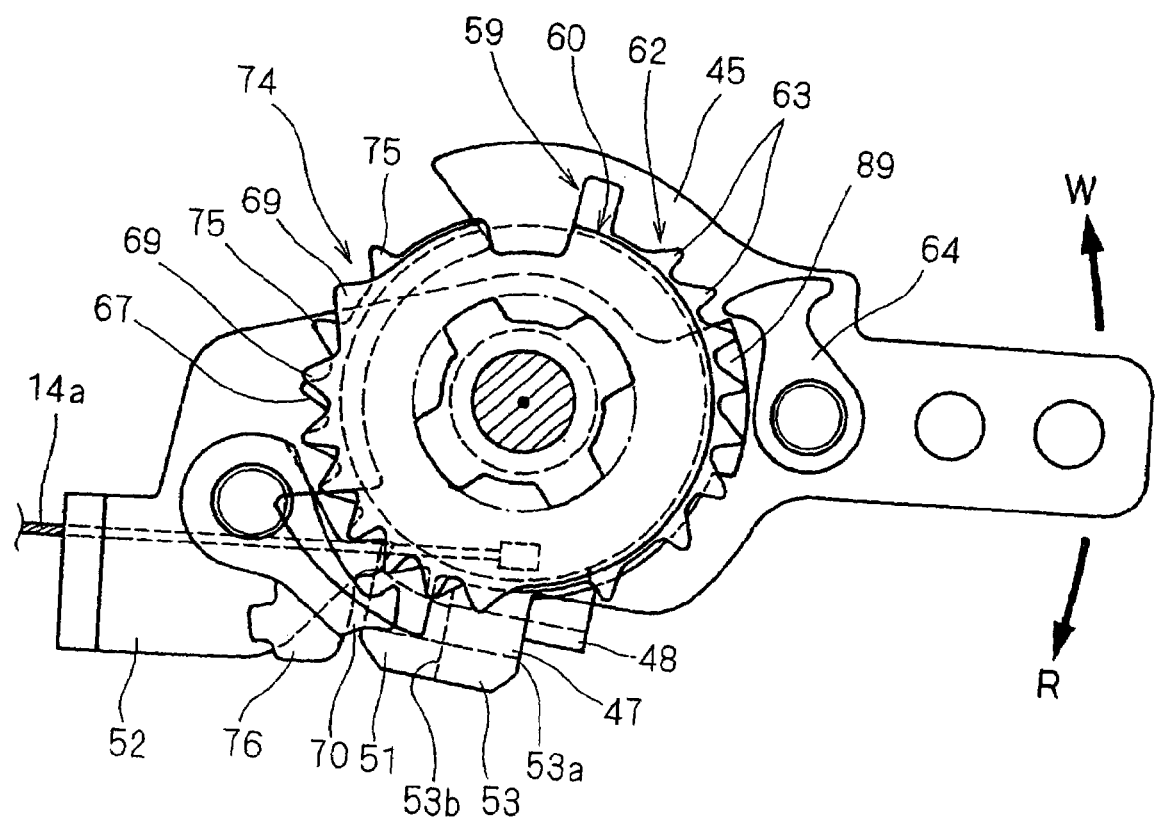
FIG. 3B is a Partial top cross-sectional view illustrating the operation of the shift control device of the bicycle control device illustrated in FIGS. 2–3.

Referring now to FIG. 3B, the shift control mechanism 40 is shown with the operating plate 45 in a stationary position. In this position, the winding abutment 48 and the releasing abutment 51 are biased toward the fixed abutment 53 with the winding abutment 48 and the releasing abutment 51 contacting opposite sides of the fixed abutment 53. Also, the operating abutment 47 is located between the winding abutment 48 and the releasing abutment 51. The fixed plate 52 has a cam 89 on which the pawl 64 rests, when the shift control mechanism 40 is in the rest position. In addition, the interrupting pawl 70 is located between the interrupting latch 67 and the releasing abutment 51. The interrupting pawl 70 is not biased toward the interrupting latch 67 and therefore does not engage the interrupting latch 67. However, the positioning pawl 76 is engaged with the positioning latch 74 to keep it and the winding member 42 from moving. In this rest position, the winding member 42 is biased in the direction R via the second spring $S_2$.

The control lever 24 is coupled to move the operating plate 45 in the direction W, when the control lever 24 is moved in the direction W. The winding pawl 64 is biased toward the winding latch 62 such that when the control lever 24 and the operating plate 45 are rotated in the direction W, the winding pawl 64 that is coupled to the operating plate 45 moves relative to the fixed plate 52 and the winding pawl 64 slides off of the cam 89 and engages the teeth 63 of the winding latch 62. The winding pawl 64 stays engaged with the teeth 63 because it is biased toward the teeth 63. With the winding pawl 64 engaged with the teeth 63, the first latch plate 59 is also rotated together with the control lever 24. The first latch plate 59 is fixedly coupled to the winding member 42. In other words, as the first latch plate 59 rotates with the control lever 24, the winding member 42 also rotates to wind up the shift cable 14a. During the rotation of these parts in the direction W, the positioning pawl 76 disengages from the positioning latch 74 and rotates to the position of the next tooth on the positioning latch 74. The operating plate 45 then returns to the rest position.

On the other hand, when the control lever 24 is moved in the direction R, the operating plate 45 is also rotated in the direction R. When the operating plate 45 is rotated in the direction R, the operating abutment 47 contacts the releasing abutment 51, which makes the releasing plate 49 rotate. When the releasing plate 49 is rotated, the release abutment 51 contacts the positioning pawl 76 and disengages the positioning pawl 76 from the positioning latch 74. The disengagement of the positioning pawl 76 allows the first latch plate 59 to rotate in the direction R. Thus, the winding member 42 also rotates in the direction R to release the shift cable 14a. However, the rotation is stopped when the interrupting pawl 70 engages with the interrupting latch 67. The operating plate 45 then returns to the rest position.

Referring again to FIGS. 8 and 9, the operation of the brake control mechanism 30 will now be described. FIGS. 8 and 9 provide simplified illustrations of the bicycle control device 12 with the shift control device 40 only diagrammatically illustrated. FIG. 8 illustrates the release position of the brake control mechanism 30, while FIG. 9 illustrates the operating or braking position of the brake control mechanism 30. The shift control device 40 can be actuated continuously or any time when the control lever 24 is moved from the brake rest position (overall rest position) to the braking position.

The outer casing 15b of the brake control cable 15 is received in the brake cable adjuster 37, which is adjustably coupled to the bracket 22 of the mounting portion 21. The brake cable 15a is coupled to the brake cable attachment portion 34, which is operatively coupled to the brake lever base 32. When the rider moves the control lever 24 in the direction B from the rest position to the operating position, the brake lever base 32 pivots about the pivot pin 36 (i.e., pivots about the pivot axis Y—Y) and moves the brake cable attachment portion 34 and the brake cable 15a relative to the outer cover 15b. The movement of the brake cable 15a relative to the outer cover 15b of the brake control cable 15 operates the rear brake device 16 in a conventional manner. The brake control mechanism 30 and the shift control mechanism 40 can be operated at the same time, as needed and/or desired. Thus, the brake rest position can move substantially vertically up and down during shifting operations.

Referring again to FIGS. 4–7, the control lever 24 is configured to be used with the bicycle control device 12 described above. The control lever 24 is configured and arranged such that the attachment section 24a operatively coupled to the control mechanism 26 for upshifting and down shifting the rear derailleur 13 by pivoting the control lever 24 about pivot axis X—X.

While the attachment section 24a and the intermediate section 24b are decribed as separate sections, it will be apparent from this disclosure that the intermediate section 24b can be considered part of the attachment section 24a. In other words, the control lever 24 can be configured with an elongated the attachment section 24a' that includes the intermediate section 24b and the attachment section 24a with the actuating section 24c extending therefrom. In any event, the actuating section 24c basically extends outwardly from the part of the control lever 24 coupled to the control mechanism 26 and the mounting portion 21. The gripping part 24d has a substantially uniform outer shape extending along a majority of the gripping part 24d. More specifically, the outer shape of the gripping part 24d is uniform along a longitudinal axis of the actuating section 24c over a distance at least equal to the width of one, or preferably two fingers of the rider.

The attachment section 24a is arranged and configured to be operatively coupled to the control mechanism 26 such that the control lever 24 actuates the control mechanism 26 during braking and gear shifting operations. The attachment section 24a has an opening 79 that is configured to receive the bearings 78 therein. The opening 79 has a central axis that corresponds to the X—X axis of the control mechanism 26.

As best shown in FIG. 6, the actuating section 24c is arranged and configured to include a hollow zone 80. The hollow zone 80 extends inwardly from a free end 81 of the control lever 24 along a longitudinal axis of the hollow zone 80. More specifically, the hollow zone 80 is formed in the actuating section 24c of the control lever 24. The hollow zone 80 is open at the free end 81 of the control lever 24 and closed at an opposite end 83 of the hollow zone 80. In other words, the hollow zone 80 is a blind bore that is open at the free end 81 of the actuating section 24c of the control lever 24.

As mentioned above, the bicycle control device 12 is preferably arranged and configured such that the rider views the bicycle control device 12 while sitting on the bicycle 10 and gripping the bicycle handlebar 11. From this viewpoint, the direction W (winding direction) is a substantially vertically downward direction of movement of the control lever 24, while the direction R (release direction) is the substantially vertically upward direction of movement of the control lever 24. More specifically, the bicycle control device 12 can be arranged and configured such that the winding and releasing directions are vertically downward and vertically upward, respectively, with respect to the ground surface.

The hollow zone 80 is dimensioned and configured to substantially reduce the weight of the control lever 24, as compared to a solid control lever of the same size. Also, the hollow zone 80 is dimensioned and configured such that the control lever 24 is strong enough to allow a rider to perform braking and/or speed changing operations via movement of the control lever 24. In any event, the control lever 24 is sufficiently lightweight such that there is a reduced amount of vertical upward and/or vertical downward movement of the control lever 24, due to vertical movement of the bicycle when it moves along a bumpy surface. This, in turn, reduces the chance of any inadvertent gear shifting as the bicycle moves along the bumpy surface.

In this embodiment, the hollow zone 80 includes a narrow part 80a and an enlarged end part 80b. At least one of the narrow part 80a and the enlarged end part 80b preferably has a circular cross-section as viewed along the longitudinal axis of the actuating section 24c. However, the narrow part 80a and the enlarged end part 80b of the hollow zone 80 can have any other suitable cross-sectional shape as needed and/or desired. Preferably, the control lever 24 is cast, and then the hollow zone 80 is formed by drilling into the control lever 24. Alternatively, it will be apparent to those skilled in the art from this disclosure that the hollow zone 80 can be formed during the manufacture of the control lever 24 by any suitable method, such as casting, machining or the like. Preferably, the control lever 24 is constructed of aluminum. However, the control lever 24 can be constructed from any other suitable material having sufficient strength characteristics to perform the braking and gear shifting operations in conjunction with the bicycle control device 12 as described herein. Preferably, the control lever 24 is formed as a one-piece, unitary member, except for an optional plug 86, as described below.

The enlarged end part 80b of the hollow zone 80 extends inwardly from the free end 81 in a first axial direction along a longitudinal axis of the hollow zone 80, to form an abutment surface 84 that faces in a second axial direction opposite to the first axial direction. The abutment surface 84 extends radially outwardly from the narrow part 80a as measured from the longitudinal axis of the hollow zone 80. The hollow zone 80 is arranged and configured to receive the optional plug 86 therein by press-fitting, threading or the like. The plug 86 prevents dirt and/or moisture from entering through the free end 81 and into the hollow zone 80. The plug 86 and the hollow zone 80 are arranged and configured such that a completely enclosed hollow interior area is formed in this embodiment, when the plug 86 is installed in the free end 81 of the control lever 24. The plug 86 also improves the overall appearance of the control lever 24 by making the control lever 24 appear as if it is a solid member.

The enlarged end part 80b and the abutment surface 84 are arranged and configured to abut a second abutment surface 87 on the plug 86 for limiting inward axial movement of the plug 86 into the hollow zone 80.

Referring now to FIG. 5, a transverse cross-sectional view of the control lever 24 is illustrated as viewed along the section line 5—5 of FIG. 4. This cross-sectional view shows an outer peripheral surface 82 of the gripping part 24d of the actuating section 24c of the control lever 24 extending outwardly from the transverse cross-section at section line 5—5 to the free end 81 of the control lever 24. As seen in FIG. 5, the cross-section of the gripping part 24d at the section line 5—5 has a some what of a modified D-shape. Also, the hollow zone 80 has a circular cross-section. The control lever 24 is shown to be solid between the hollow zone 80 and the outer peripheral surface 82. In other words, the hollow zone 80 is completely enclosed by a wall of material between the hollow zone 80 and the outer peripheral surface 82. This cross-sectional view along the section line 5—5 is located on the gripping part 24d of the actuating section 24c of the control lever 24. As mentioned above, the gripping part 24d has a substantially uniform outer shape extending along a majority of the gripping part 24d. Also, the outer shape of the gripping part 24d is uniform along a longitudinal axis of the actuating section 24c over a distance at least equal to the width of one, or preferably two fingers of the rider. In other words, the outer peripheral surface 82 extends along the gripping part 24d at least where the rider's index and middle fingers normally contact the outer peripheral surface 82.

Figure 7:
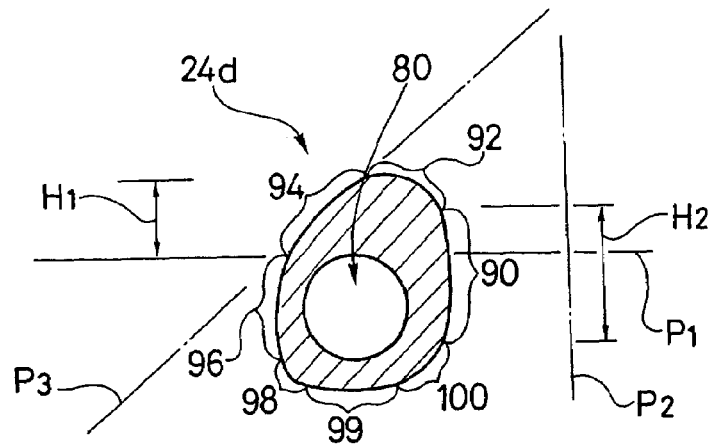
FIG. 7 is a further enlarged, partial transverse cross-sectional view of the control lever illustrated in FIGS. 4–6, as viewed along the section line 5—5 of FIG. 4.

Referring now to FIG. 7, this figure shows an enlarged partial transverse cross-sectional view of the cross-section along the section line 5—5 of FIG. 4. This partial transverse cross-sectional view is identical to the cross-sectional view shown in FIG. 5, except that FIG. 7 shows an enlarged cross-sectional view and the outer periphery 88 of the control lever 24 is removed for clarity.

The outer peripheral surface 82 includes has a first actuation surface 90, a first curved connecting surface 92, an inclined second actuation surface 94, a vertical side surface 96, a second curved connecting surface 98, a first upper surface 99 and a third curved connecting surface 100. These surfaces are contiguously coupled together such that the outer peripheral surface is a continuous, smooth annular surface.

More specifically, a first end of the first actuation surface 90 is contiguously coupled to a first end of the first curved connecting surface 92, while a second end of the first curved connecting surface 92 is contiguously coupled to a first end of the inclined second actuation surface 94. A second end of the inclined second actuation surface 94 is then contiguously coupled to a first end of the vertical side surface 96. A second end of the vertical side surface 96 is contiguously coupled to a first end of the second curved connecting surface 98. A second end of the second curved connecting surface 98 is then contiguously coupled to a first end of the first upper surface 99. A second end of the first upper surface 99 is then contiguously coupled to a first end of the third curved connecting surface 100. Finally, a second end of the third curved connecting surface 100 is contiguously coupled to the second end of the first actuation surface 90. The inclined second actuation surface 94 is adjacent to the first curved connecting surface 92 and adjacent to the vertical side surface 96. The first, second and third curved connecting surfaces 92, 98 and 100, respectively, are convex curved surfaces. The vertical side surface 96 faces in a direction substantially opposite to the first actuation surface 90.

As mentioned above, movement of the control lever 24 in the direction R causes the shift cable 14a to be released. More specifically, the rider applies an actuation force to the inclined second actuation surface 94 via a finger nail side of the rider's hand (opposite to the palm of the rider's hand), which lifts up the control lever 24 in the direction R and releases the shift cable 14a. The inclined second actuation surface 94 is relatively large and has a sufficiently smooth interface with both the vertical side surface 96 and the first curved connecting surface 92 such that the control lever 24 is comfortable (not painful) for the rider to operate the control lever 24 in the direction R.

Referring still to FIGS. 4, 5 and 7, the first plane $P_1$ extends parallel to the lower edge surface 85 of the control lever 24 and the axis X—X. Also, the control lever 24 has the attachment section 24a with the front side surface 24f lying in the second plane $P_2$ that extends perpendicular to the axis X—X. Preferably, the second plane $P_2$ is substantially perpendicular to the first plane $P_1$.

Again, the outer shape of the gripping part 24d is uniform along a longitudinal axis of the actuating section 24c over a distance at least equal to the width of one, or preferably two fingers of the rider. In other words, the outer peripheral surface 82 extends along the gripping part 24d at least where the rider's index and middle fingers normally contact the outer peripheral surface 82.

The first actuation surface 90 extends in a direction substantially perpendicular to the first plane $P_1$. The first actuation surface 90 faces outwardly in a direction substantially parallel to the axis X—X, while the inclined second actuating surface 94 faces outwardly in a direction that is substantially opposite to the direction that the first actuation surface 90 faces. In other words, the inclined second actuation surface 94 faces substantially away from the first actuation surface 90.

Referring now to FIGS. 2, 4, 5 and 7, the inclined second actuation surface 94 faces in a direction substantially opposite to the front side surface 24f of the attachment section 24c of the control lever 24. In other words, the inclined second actuation surface 94 faces substantially towards the bicycle handlebar 11. Also, the inclined second actuation surface 94 is arranged and configured to extend outwardly in a direction (i.e., substantially along a third plane $P_3$) that intersects the first and second planes $P_1$ and $P_2$. In other words, the inclined second actuation surface 94 at least partially lies in the third plane $P_3$. As best shown in FIG. 7, the inclined second actuation surface 94 has a transverse height $H_1$ that is at least one-half of a transverse height $H_2$ of the first actuation surface 90. The transverse heights $H_1$ and $H_2$ are measured in a perpendicular direction to the first plane $P_1$.

Second Embodiment

Figure 10:
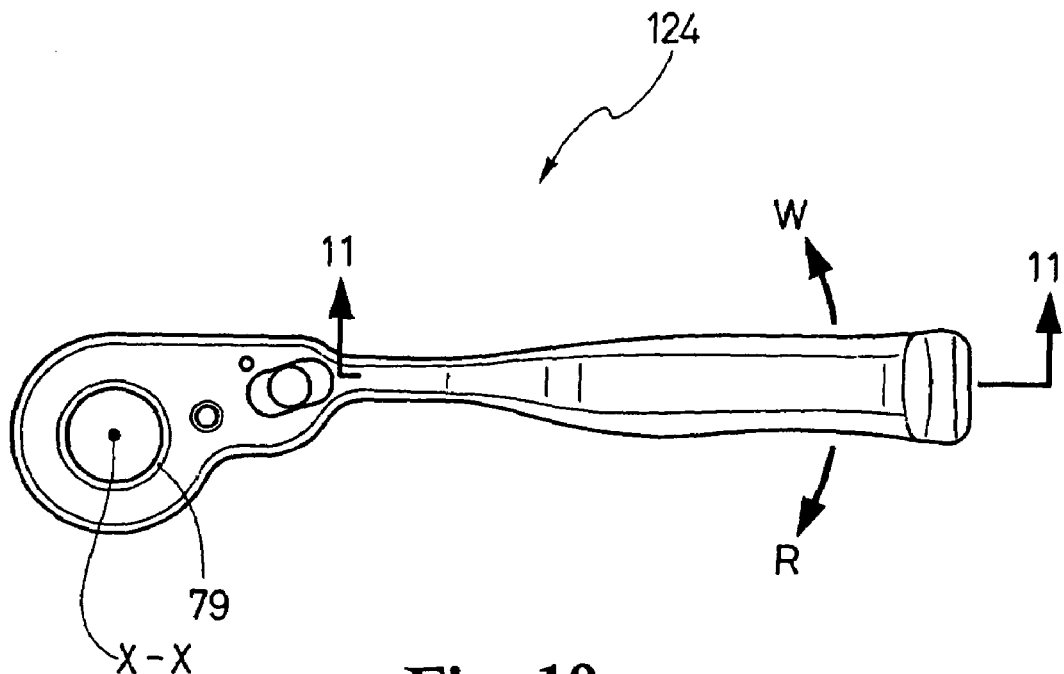
FIG. 10 is a substantially front elevational view of a control lever in accordance with a second embodiment of the present invention.
Figure 11:
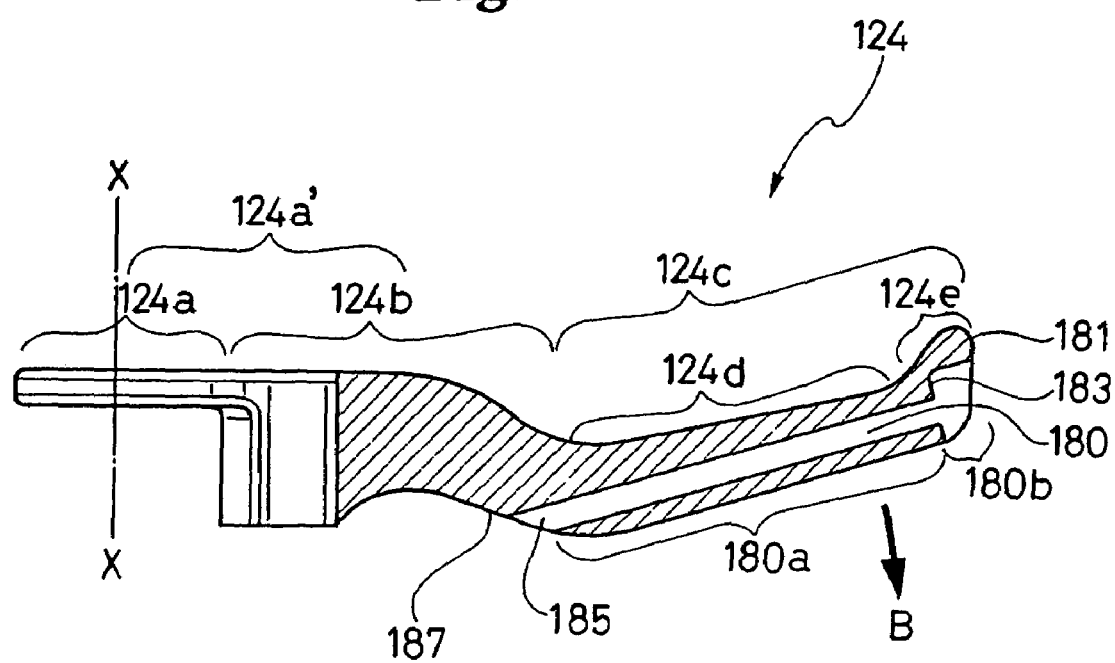
FIG. 11 is a partial cross-sectional view of the control lever illustrated in FIG. 10 as viewed along section line 11—11 of FIG. 10, with the attachment section shown in elevation for the purpose of illustration.

Referring now to FIGS. 10 and 11, a control lever 124 is illustrated in accordance with a second embodiment of the present invention. The control lever 124 of this second embodiment is configured to be used in the bicycle control device 12 of the first embodiment. In other words, the control lever 24 of the bicycle control device 12 of the first embodiment can be replaced with the control lever 124 of this second embodiment to form a modified bicycle control device. Thus, the control lever 124 is installed on the bicycle control device 12 in the same manner as discussed above in connection with the control lever 24 of the first embodiment.

The only difference between the control lever 124 of this second embodiment and the control lever 24 of the first embodiment is a hollow zone 180 disposed in the control lever 124. In view of the similarities between this second embodiment and the first embodiment, the following description will focus mainly on the difference. However, it will be apparent to those skilled in the art from this disclosure that the descriptions and illustrations of the first embodiment also apply to this second embodiment, except as discussed and illustrated herein.

Thus, the control lever 124 basically includes an attachment section 124a, an intermediate section 124b, and an actuating section 124c that are identical to the attachment section 24a, the intermediate section 24b and the actuating section 24c, respectively, of the control lever 24, except for the hollow zone 180 disposed in the control lever 124. The actuating section 124c has a gripping part 124d with a substantially uniform transverse cross-section relative to a longitudinal axis of the actuating section 124c. The attachment section 124a and the intermediate section 124b can together be considered a single elongated attachment section 124a' as described in the first embodiment.

The control lever 124 is configured and arranged to include the hollow zone 180 that extends axially completely through the control lever 124. More specifically, the hollow zone 180 extends inwardly from a free end 181 of the control lever 124 through the actuating section 124c, through a portion of the intermediate section 124b and through a peripheral surface 187 of the control lever 124. The hollow zone 180 is dimensioned and configured to substantially reduce the weight of the control lever 124, as compared to a solid control lever of the same size. The hollow zone 180 is also dimensioned and configured such that the control lever 124 is strong enough to allow a rider to perform braking and/or speed changing operations via movement of the control lever 124. In any event, the control lever 124 is sufficiently lightweight such that there is a reduced amount of vertical upward and/or vertical downward movement of the control lever 124, due to vertical movement of the bicycle when it moves along a bumpy surface. This, in turn, reduces the chance of any inadvertent gear shifting as the bicycle moves along the bumpy surface, as described above for the control lever 24 of the first embodiment.

As shown in FIG. 11, the hollow zone 180 of the control lever 124 preferably includes a narrow part 180a and an enlarged end part 180b. Preferably, at least one of the narrow part 180a and the enlarged end part 180b has a circular cross-section as viewed along the longitudinal axis of the hollow zone 180. However, the narrow part 180a and the enlarged end part 180b of the hollow zone 180 can have any other suitable cross-sectional shape as needed or desired. Preferably, the control lever 124 is cast, and then the hollow zone 180 is formed by drilling through the control lever 124. Alternatively, it will be apparent to those skilled in the art from this disclosure that the hollow zone 180 can be formed during the manufacture of the control lever 124 by any suitable method, as mentioned above. It will be apparent to those skilled in the art from this disclosure that the hollow zone 180 can be formed with closed ends during the manufacture of the control lever 124 such that the hollow zone 180 extends between the actuating section 124c and the intermediate section 124b of the control lever 24.

The enlarged end part 180b extends inwardly from the free end 181 in a first axial direction along the longitudinal axis of the hollow zone 180, to form an abutment surface 183 that faces in a second axial direction opposite to the first axial direction. The enlarged end part 180b and the abutment surface 183 are identical to the enlarged end part 80b and the abutment surface 84, respectively, of the first embodiment.

It will be apparent to those skilled in the art from this disclosure that the plug 86 of the first embodiment can optionally be provided at the free end 181 through the enlarged end part 180b, to prevent dirt and/or moisture from entering through the free end 181 and into the hollow zone 180. Moreover, it will be apparent to those skilled in the art from this disclosure that another plug (not shown) that is similar to the plug 86 can optionally be provided at a second end 185 of the hollow zone 180, to prevent dirt and/or moisture from entering through the second end 185 and into the hollow zone 180.

Third Embodiment

Figure 12:
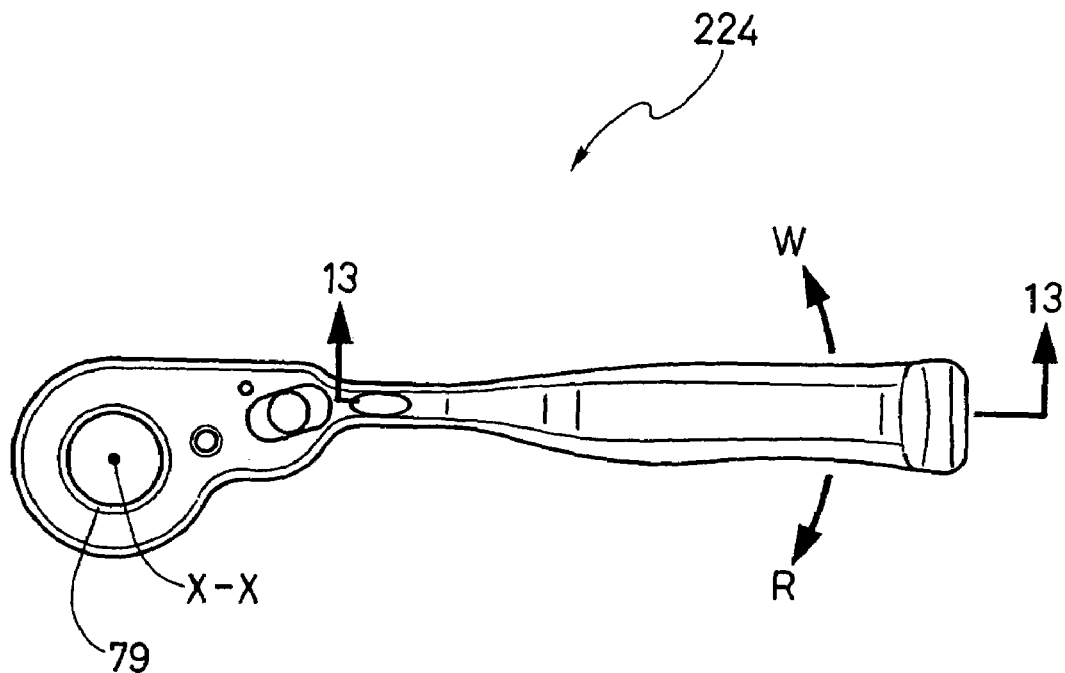
FIG. 12 is a substantially front elevational view of a control lever in accordance with a third embodiment of the present invention.
Figure 13:
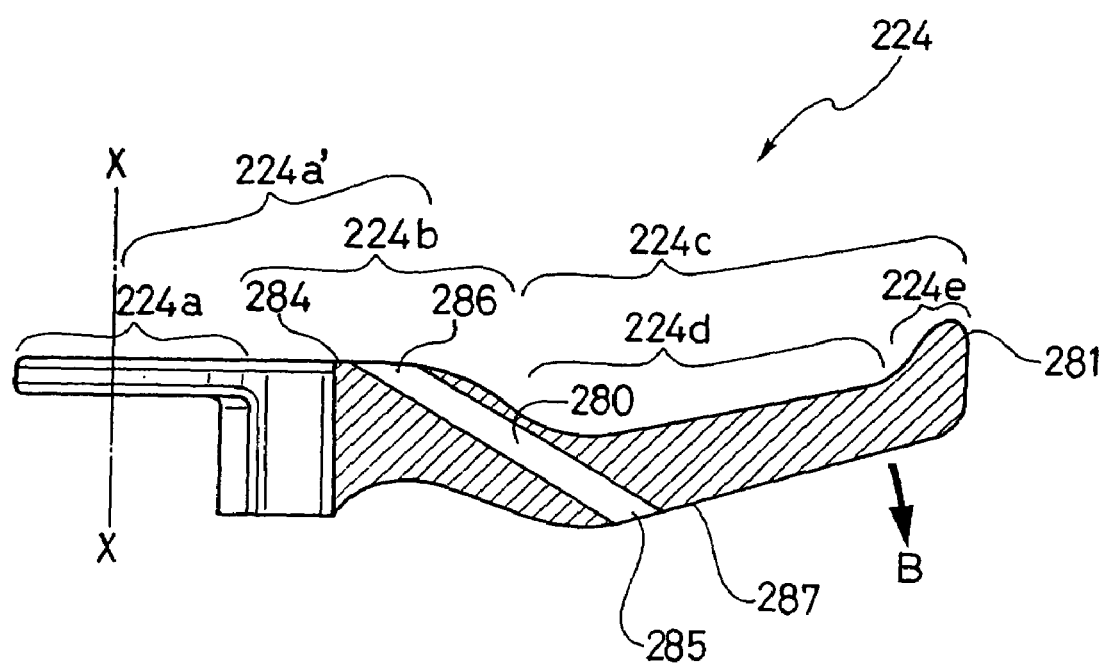
FIG. 13 is a partial cross-sectional view of the control lever illustrated in FIG. 12 as viewed along section line 13—13 of FIG. 12, with the attachment section shown in elevation for the purpose of illustration.

Referring now to FIGS. 12 and 13, a control lever 224 is illustrated in accordance with a third embodiment of the present invention. The control lever 224 of this third embodiment is configured to be used in the bicycle control device 12 of the first embodiment. In other words, the control lever 24 of the bicycle control device 12 of the first embodiment can be replaced with the control lever 224 of this third embodiment. Thus, the control lever 224 is installed on the bicycle control device 12 in the same manner as discussed above in connection with the control lever 24 of the first embodiment.

The only difference between the control lever 224 of this third embodiment and the control lever 24 of the first embodiment is a hollow zone 280 disposed in the control lever 224. In view of the similarities between this third embodiment and the first embodiment, the following description will focus mainly on the difference. However, it will be apparent to those skilled in the art from this disclosure that the descriptions and illustrations of the first embodiment also apply to this third embodiment, except as explained and illustrated herein.

Thus, the control lever 224 basically includes an attachment section 224a, an intermediate section 224b, and an actuating section 224c that are identical to the attachment section 24a, the intermediate section 24b and the actuating section 24c, respectively, of the control lever 24, except for the hollow zone 280 disposed in the control lever 224. The actuating section 224c has a gripping part 224d with a substantially uniform transverse cross-section relative to a longitudinal axis of the actuating section 224c. The attachment section 224a and the intermediate section 224b together can be considered a single elongated attachment section 224a' as described in the first embodiment.

The control lever 224 is configured and arranged to include the hollow zone 280 that extends completely through the control lever 224 between a first peripheral surface 283 and a second peripheral surface 284 of the control lever 224. More specifically, the hollow zone 280 extends diagonally along a longitudinal axis through a portion of the actuating section 224c and a portion of the intermediate section 224b of the control lever 224.

The hollow zone 280 is dimensioned and configured to substantially reduce the weight of the control lever 224, as compared to a solid control lever of the same size. Also, the hollow zone 280 is dimensioned and configured such that the control lever 224 is strong enough to allow a rider to perform braking and/or speed changing functions via movement of the control lever 224. In any event, the control lever 224 is sufficiently lightweight such that there is a reduced amount of vertical upward and/or vertical downward movement of the control lever 224, due to vertical movement of the bicycle when it moves along a bumpy surface. This, in turn, reduces the chance of any inadvertent gear shifting as the bicycle moves along the bumpy surface, as described above for the control lever 24 of the first embodiment.

The hollow zone 280 preferably has a circular cross-section as viewed along the longitudinal axis of the hollow zone 280. Alternatively, the hollow zone 280 can have any other suitable cross-sectional shape as needed and/or desired. The control lever 224 can be cast and then the hollow zone 280 can be formed by drilling the control lever 224. However, it will be apparent to those skilled in the art from this disclosure that the hollow zone 280 can be formed during the manufacture of the control lever 224 by any suitable method, as mentioned above. It will be apparent to those skilled in the art from this disclosure that the hollow zone 280 can be formed with closed ends during the manufacture of the control lever 224 such that the hollow zone 280 extends between the actuating section 224c and the intermediate section 224b of the control lever 224.

It will also be apparent to those skilled in the art from this disclosure that a plug similar to the plug 86 of the first embodiment can optionally be provided at a first end 285 of the hollow zone 280 and/or a second end 286 of the hollow zone 280, to prevent dirt and/or moisture from entering into the hollow zone 280. These plugs (not shown) also improves the overall appearance of the control lever 224 by making the control lever 224 appear as if it is a solid member.

Fourth Embodiment

Figure 14:
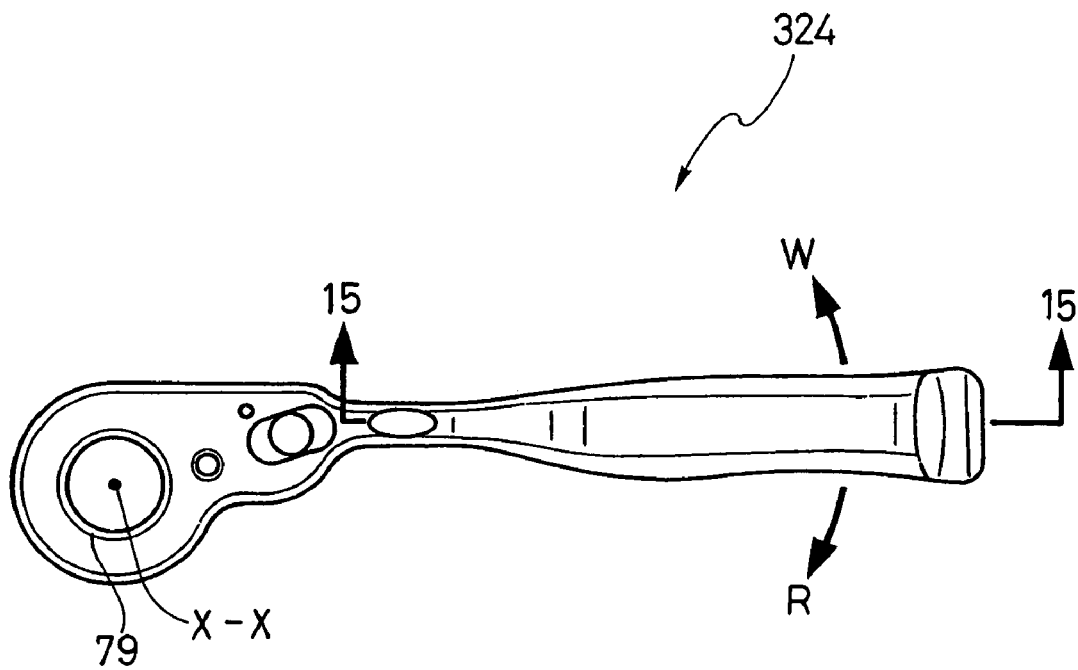
FIG. 14 is a substantially front elevational view of a control lever in accordance with a fourth embodiment of the present invention.
Figure 15:
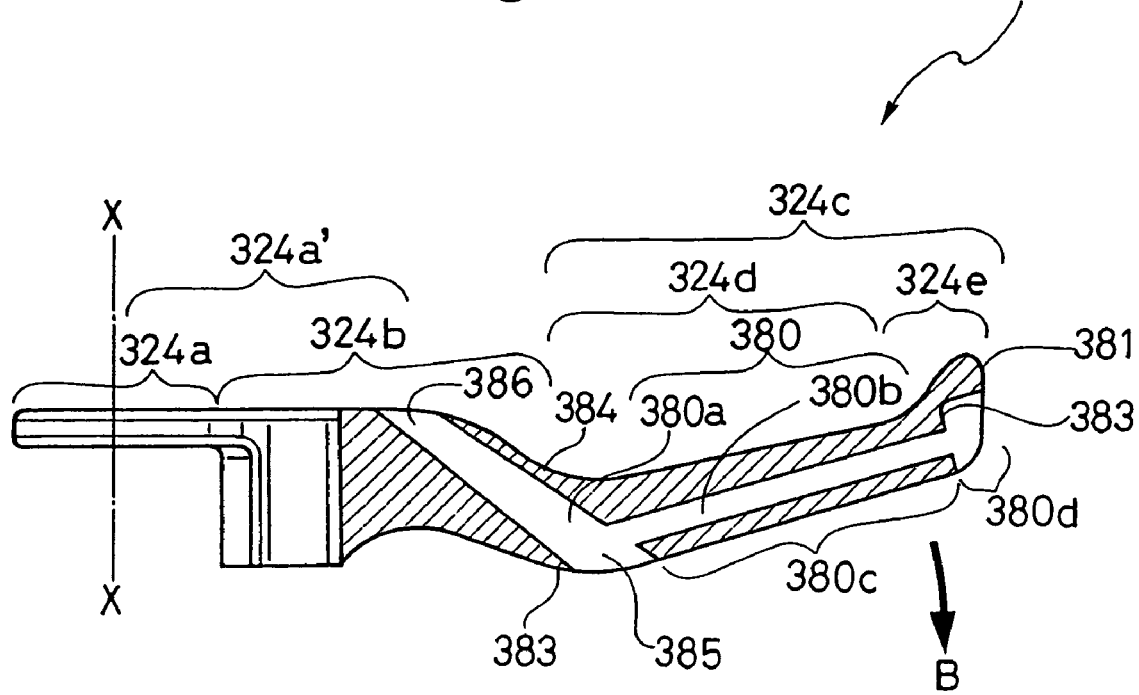
FIG. 15 is a partial cross-sectional view of the control lever illustrated in FIG. 14 as viewed along section line 15—15 of FIG. 14, with the attachment section shown in elevation for the purpose of illustration.

Referring now to FIGS. 14 and 15, a control lever 324 is illustrated in accordance with a fourth embodiment of the present invention. The control lever 324 of this fourth embodiment is configured to be used in the bicycle control device 12 of the first embodiment. In other words, the control lever 24 of the bicycle control device 12 of the first embodiment can be replaced with the control lever 324 of this fourth embodiment. Thus, the control lever 324 is installed on the bicycle control device 12 in the same manner as discussed above in connection with the control lever 24 of the first embodiment.

The only difference between the control lever 324 of this fourth embodiment and the control lever 24 of the first embodiment is a hollow zone 380 disposed in the control lever 324. In view of the similarities between this fourth embodiment and the first embodiment, the following description will focus mainly on the difference. However, it will be apparent to those skilled in the art from this disclosure that the descriptions and illustrations of the first embodiment also apply to this fourth embodiment, except as discussed and illustrated herein.

Thus, the control lever 324 basically includes an attachment section 324a, an intermediate section 324b, and an actuating section 324c that are identical to the attachment section 24a, the intermediate section 24b and the actuating section 24c, respectively, of the control lever 24, except for the hollow zone 380 disposed in the control lever 324. The actuating section 324c has a gripping part 324d with a substantially uniform transverse cross-section relative to a longitudinal axis of the actuating section 324c. The attachment section 324a and the intermediate section 324b can together be considered a single elongated attachment section 324a' as described in the first embodiment.

The control lever 324 is configured and arranged to include the hollow zone 380. The hollow zone 380 includes a first hollow section 380a (i.e., similar to the hollow zone 280 of the third embodiment) and a second hollow section 380b (i.e., similar to the hollow zone 80 of the first embodiment). The first hollow section 380a extends completely through the control lever 324 from a first peripheral surface 383 to a second peripheral surface 384 of the control lever 324. More specifically, the first hollow section 380a extends diagonally along a first longitudinal axis through a portion of the actuating section 324c and through a portion of the intermediate section 324b.

The second hollow section 380b extends axially along a second longitudinal axis through the actuating section 324c and intersects the first hollow section 380a. More specifically, the second hollow section 380b starts at a free end 381 of the control lever 324 and extends through a portion of the actuation section 324c, where it intersects the first hollow section 380a. FIG. 13 shows that the first and second hollow sections 380a and 380b intersect to form a substantially v-shaped cross-section as viewed perpendicular to the first and second longitudinal axes of the first and second hollow sections 380a and 380b. The hollow zone 380, which includes the first and second hollow sections 380a and 380b, extends along the entire actuating section 324c and a portion of the intermediate section 324b of the control lever 324.

The first and second hollow sections 380a and 380b of the hollow zone 380 are dimensioned and configured to substantially reduce the weight of the control lever 324, as compared to a solid control lever of the same size. Also, the first and second hollow sections 380a and 380b are dimensioned and configured such that the control lever 324 is strong enough to allow a rider to perform braking and/or speed changing functions via movement of the control lever 324. In any event, the control lever 324 is sufficiently lightweight such that there is a reduced amount of vertical upward and/or vertical downward movement of the control lever 324, due to vertical movement of the bicycle when it moves along a bumpy surface. This, in turn, reduces the chance of any inadvertent gear shifting as the bicycle moves along the bumpy surface, as described above for the control lever 24 of the first embodiment.

As best shown in FIG. 15, the first hollow section 380a is preferably tapered. On the other hand, the second hollow section 380b preferably includes a narrow part 380c and an enlarged end part 380d. The enlarged end part 380d extends inwardly in a first axial direction along the longitudinal axis of the hollow section 380 to form an abutment surface 383 that faces in a second axial direction opposite to the first axial direction. The enlarged end part 380d and the abutment surface 383 are identical to the enlarged end part 80b and the abutment surface 84, respectively, of the first embodiment. The first hollow section 380a can have circular cross-section as viewed along the first longitudinal axis of the first hollow section 380a. Also, at least one of the narrow part 380c and the enlarged end part 380d of the second hollow section 380b preferably has a circular cross-section as viewed along the longitudinal axis of the second hollow section 380b. The first hollow section 380a also preferably has a circular shaped cross-section as viewed along its longitudinal axis.

However, the first and second hollow sections 380a and 380b can have any other suitable cross-sectional shapes as needed or desired. The control lever 324 can be cast, and then the first and second hollow sections 380a and 380b can be formed by drilling the control lever 324. Alternatively, it will be apparent to those skilled in the art from this disclosure that the first and second hollow sections 380a and 380b can be formed during the manufacture of the control lever 324 by any suitable method, as mentioned above. It will be apparent to those skilled in the art from this disclosure that the hollow zone 380 can be formed with closed ends during the manufacture of the control lever 324 such that the hollow zone 380 extends between the actuating section 324c and the intermediate section 324b of the control lever 24.

It will be apparent to those skilled in the art from this disclosure that the plug 86 of the first embodiment can optionally be provided at a free end 381 of the control lever 324 that is inserted into the enlarged part 380d of the second hollow part 380b, to prevent dirt and/or moisture from entering the second hollow section 380b. Similarly, plugs that are similar to the plug 86 of the first embodiment can optionally be provided at first and second ends 385 and 386 of the first hollow section 380a, to prevent dirt and/or moisture from entering into the first hollow section 380a. All of the plugs improve the overall appearance of the control lever 324 by making the control lever 324 appear as if it is a solid member.

Fifth Embodiment

Figure 16:
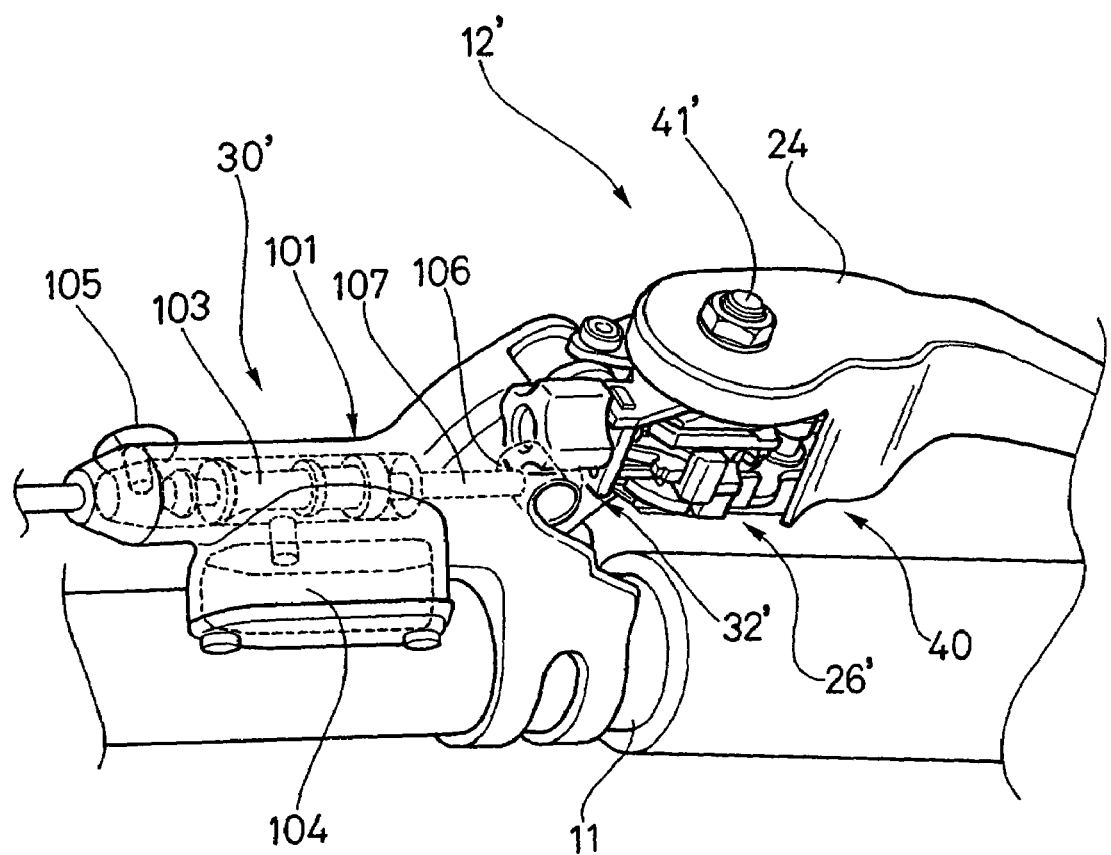
FIG. 16 is a diagrammatic perspective view of a bicycle control device connected to a hydraulic brake mechanism in accordance with a fifth embodiment of the present invention.

Referring now to FIG. 16, a bicycle control device 12' in accordance with a fifth embodiment of the present invention is illustrated. This fifth embodiment is substantially identical to the first embodiment. In particular, the control device 12' of this fifth embodiment is substantially identical to the control device 12 of the first embodiment, except the control device 12' includes a modified control mechanism 26'. The modified control mechanism 26' basically includes a hydraulic brake control mechanism 30' and a shift control mechanism 40. The modified control mechanism 26' can be understood from in U.S. Patent Application Publication No. US2002/0139637 (assigned to Shimano, Inc.). Thus, control mechanism 26' will not be discussed and/or illustrated in detail herein. In any case, the control device 12' of this fifth embodiment preferably utilizes a control lever 24 of the first embodiment operatively coupled to the modified control mechanism 26'.

In view of the similarities between this fifth embodiment and the first embodiment, this fifth embodiment will not be discussed and/or illustrated in detail herein. Rather, the following descriptions and illustrations will focus mainly on the differences between this fifth embodiment and the first embodiment. However, it will be apparent to those skilled in the art from this disclosure that most of the descriptions and illustrations of the first embodiment also apply to this fifth embodiment, except as explained and illustrated herein. Additionally, in view of the similarities between this fifth embodiment and the first embodiment, like reference numerals will be used to identify identical parts. Moreover, in view of the similarities between this fifth embodiment and the first embodiment, parts of this fifth embodiment that are functionally identical to parts of the first embodiment will be identified with like reference numerals but with a prime "'".

The brake control mechanism 30' includes a piston and cylinder structure, as discussed below, and a mounting pin or axle 41' with the shift control mechanism 40 mounted thereon in a manner substantially identical to the first embodiment. The control lever 24 is normally biased by a spring member (not shown) toward the neutral or rest position, as shown in FIG. 16, after moving the control lever 24 to the operating (braking) position and releasing the control lever 24. The control levers 124, 224 and 324 of the second, third and fourth embodiments could also be used with the device 12' of this fifth embodiment.

The hydraulic brake control mechanism 30' basically includes the pin 41', a hydraulic brake bracket 101 (with a cylinder), a piston 103, a fluid reservoir 104, an outlet 105, a nipple 106 and a pin 107. The piston 103 is housed within the brake bracket 101 and controls communication between the fluid reservoir 104 and the outlet 105. The brake bracket 101 is coupled to the handlebar 11 of the bicycle 10 in a manner substantially identical to the first embodiment. The control lever 24 is coupled to the piston 103 via a modified brake lever base 32' and the pin 107. Thus, when the control lever 24 is moved in the braking direction, the piston 103 moves with the control lever 24. The piston 103 then pushes the brake fluid toward the outlet 105, which is connected to a brake line. Thus, fluid from the fluid reservoir 104 flows through the brake line, to operate a hydraulic brake device (not shown) in a conventional manner. The shift control mechanism 40 is actuated by rotating the control lever 24 about the pin 41' in a manner substantially identical to the first embodiment. Thus, the brake lever 24 of the control device 12' moves along two planes in a manner identical or substantially identical to the first embodiment.

The terms of degree such as "substantially", "about" and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents. Thus, the scope of the invention is not limited to the disclosed embodiments.

What is claimed is:

1. A bicycle control device comprising:
   a mounting portion adapted to be coupled to a bicycle handlebar;
   a control mechanism coupled to the mounting portion; and
   a control lever operatively coupled to the control mechanism to move along a first plane between a rest position and a operating position and along a second plane substantially perpendicular to the first plane between the rest position and a first position vertically spaced from the rest position,
   the control lever including an attachment section and an actuating section extending from the attachment section, the attachment section being operatively coupled to the control mechanism, the actuating section having a first actuation surface extending in a direction substantially perpendicular to the first plane and an inclined second actuation surface facing substantially away from the first actuation surface downwardly and towards the handlebar, the inclined second actuation surface extending in a direction intersecting the first and second planes,
   the inclined second actuation surface having a transverse height that is at least one-half of the transverse height of the first actuation surface with the transverse heights being measured in directions perpendicular to the first plane,
   the actuating section having a hollow zone formed therein that extends axially along the actuating section of the control lever, the hollow zone being a blind bore that is open at a free end of the actuating section of the control lever.

2. The bicycle control device according to claim 1, wherein
the control mechanism includes a shift control mechanism that is arranged and configured to control movement of a shift control cable upon movement of the control lever.

3. The bicycle control device according to claim 1, wherein
the control mechanism includes a brake control mechanism.

4. The bicycle control device according to claim 1, wherein
the hollow zone has a plug mounted therein at the free end of the actuating section to form a hollow interior area.

5. The bicycle control device according to claim 1, wherein
the control lever is constructed of cast aluminum.

6. The bicycle control device according to claim 1, wherein
the control lever includes a brake cable attachment portion arranged and configured to pull a brake control cable upon movement of the control lever from the rest position to the operating position when a substantially rearward force is applied to the first actuation surface.

7. The bicycle control device according to claim 6, wherein
the control lever is normally biased toward the rest position in order to release the brake control cable after moving the control lever to the operating position and releasing the control lever.

8. The bicycle control device according to claim 7, wherein
the control mechanism includes a shift control mechanism that is arranged and configured to control movement of a shift control cable upon movement of the control lever along the second plane.

9. The bicycle control device according to claim 1, wherein
the control mechanism includes a piston and cylinder structure.

10. The bicycle control device according to claim 9, wherein
the control lever is normally biased toward the rest position.

11. The bicycle control device according to claim 10, wherein
the control mechanism includes a shift control mechanism that is arranged and configured to control movement of a shift control cable upon movement of the control lever along the second plane.

12. The bicycle control device according to claim 1, wherein
the control lever is constructed of a cast material that is drilled in order to form the hollow zone.

* * * * *